Feb. 16, 1971   G. B. K. MEACHAM ET AL   3,564,579
VALVE ROTATING DEVICE
Filed April 25, 1969   4 Sheets-Sheet 1
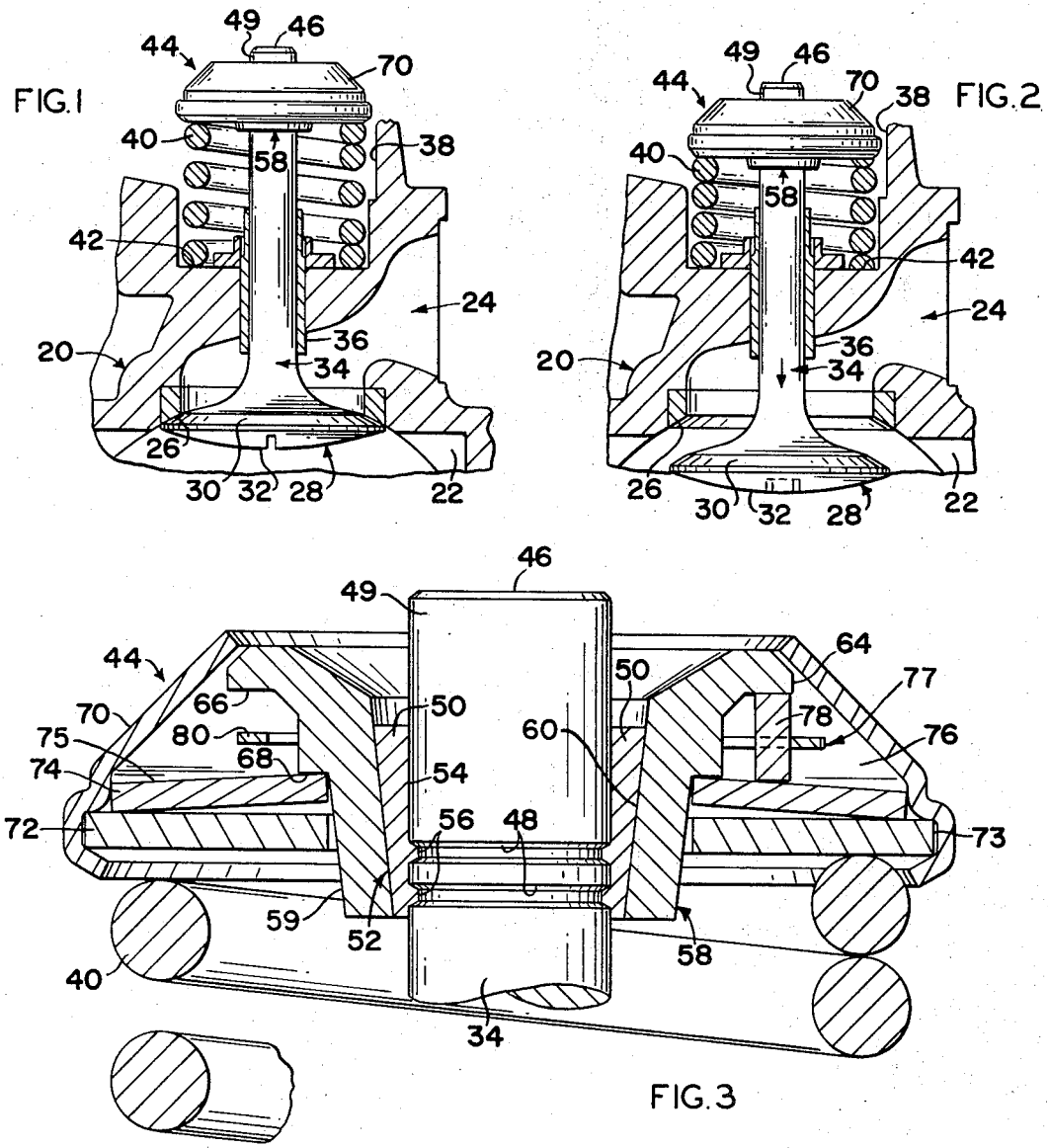
INVENTORS
GEORGE B. K. MEACHAM
AND VERNON A. JOHNSON
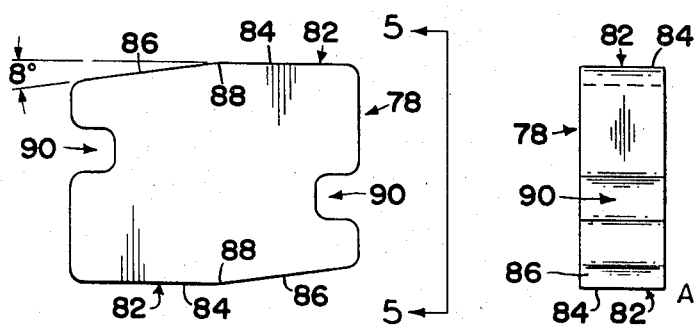
ATTORNEY.

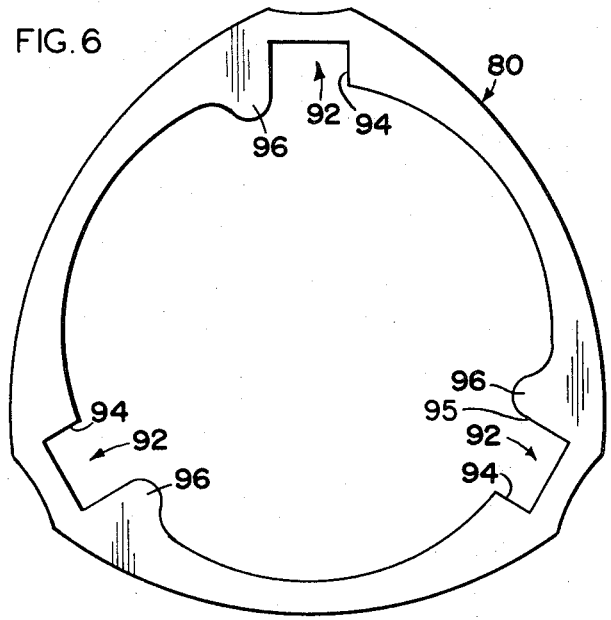
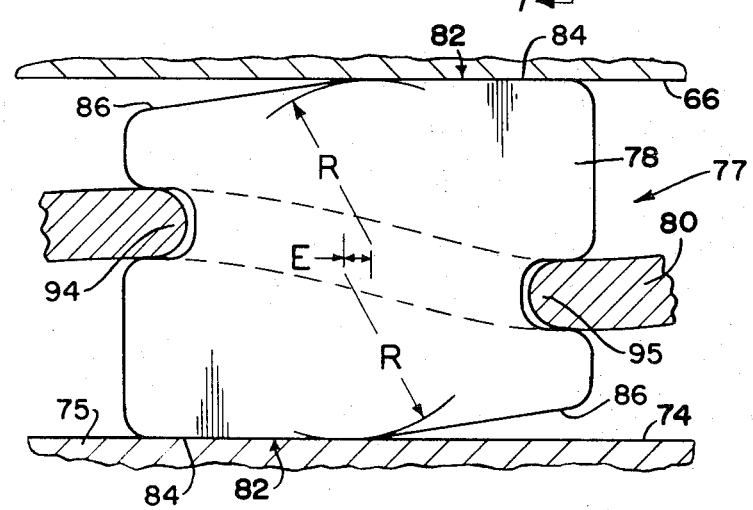
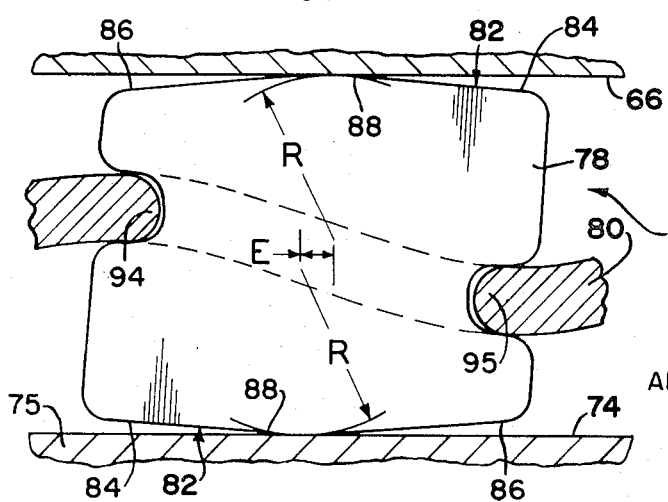
INVENTORS
GEORGE B.K. MEACHAM
AND VERNON A. JOHNSON

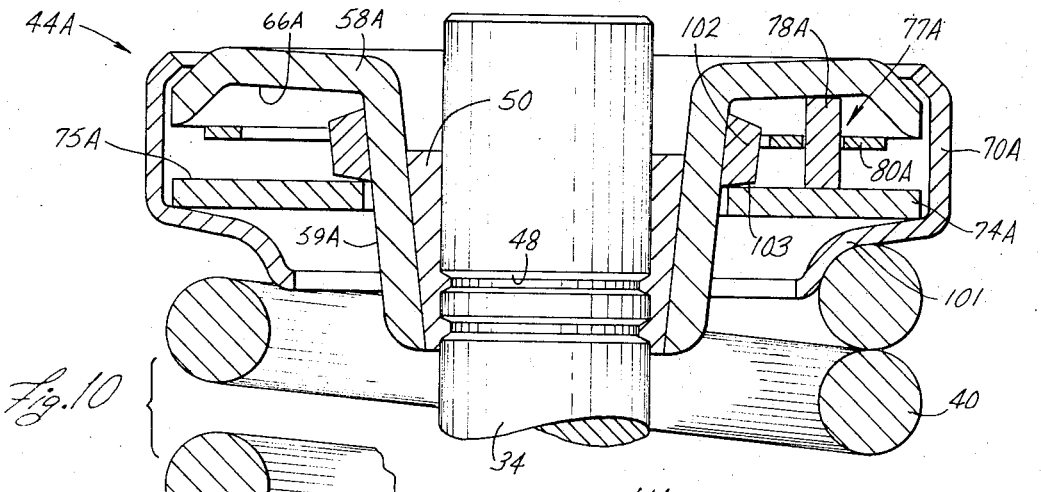
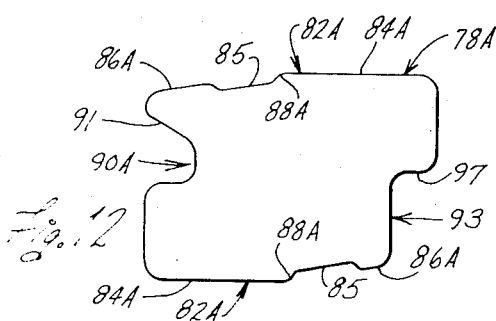
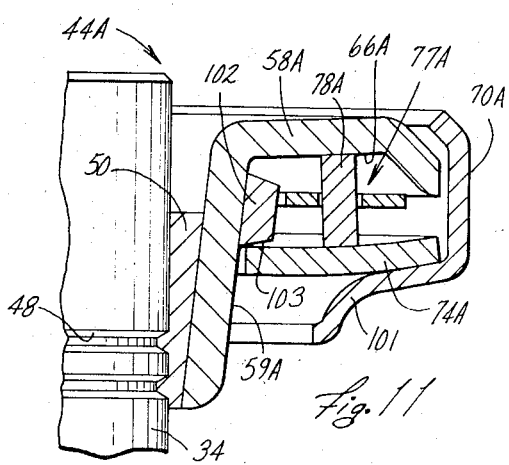
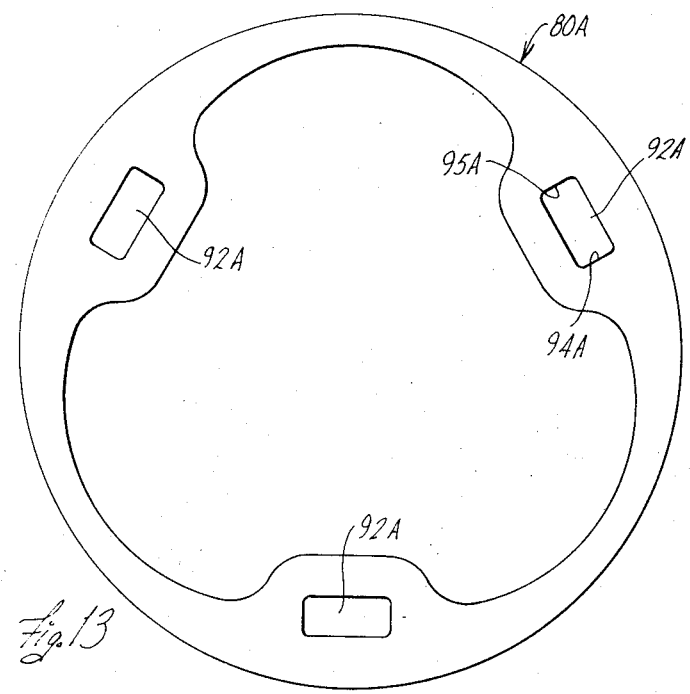
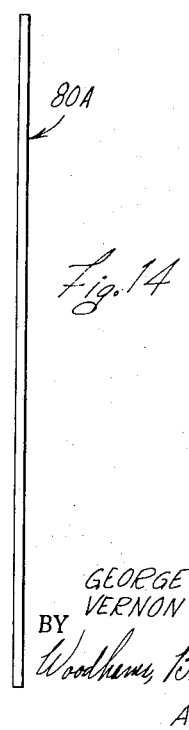

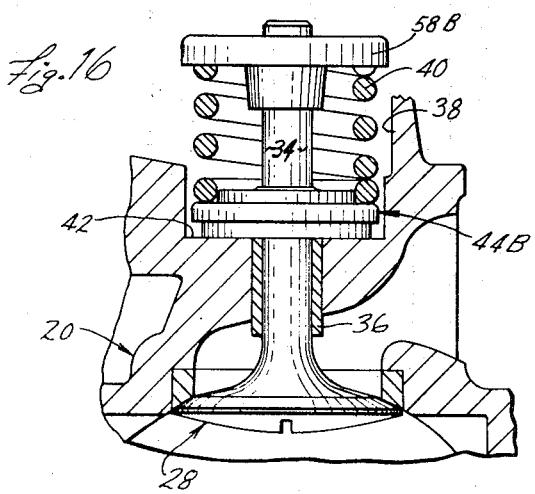
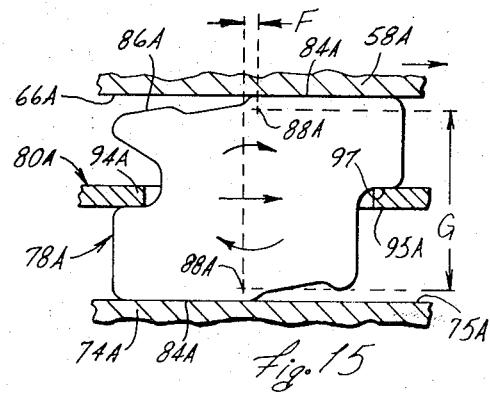
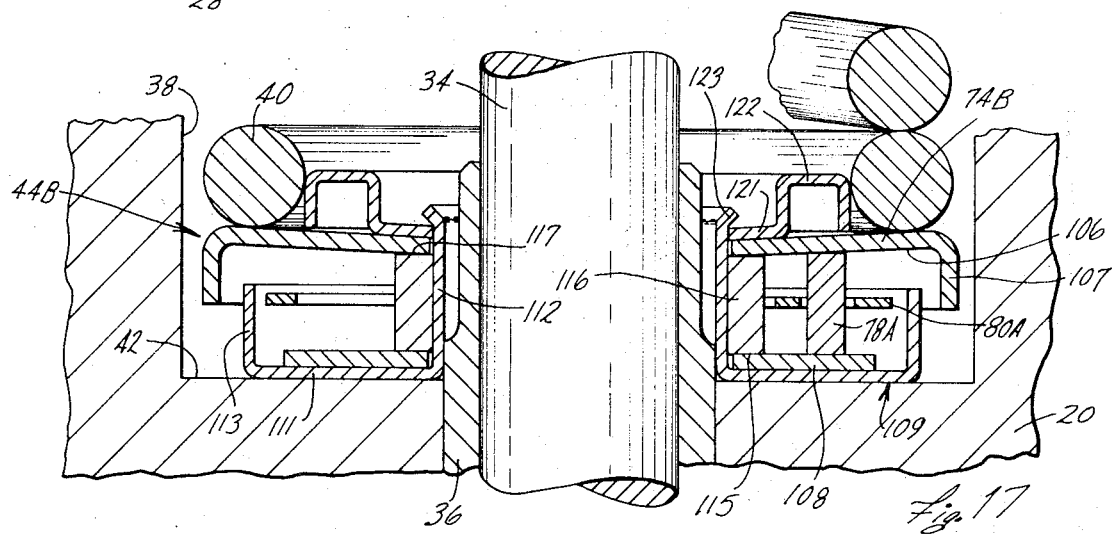
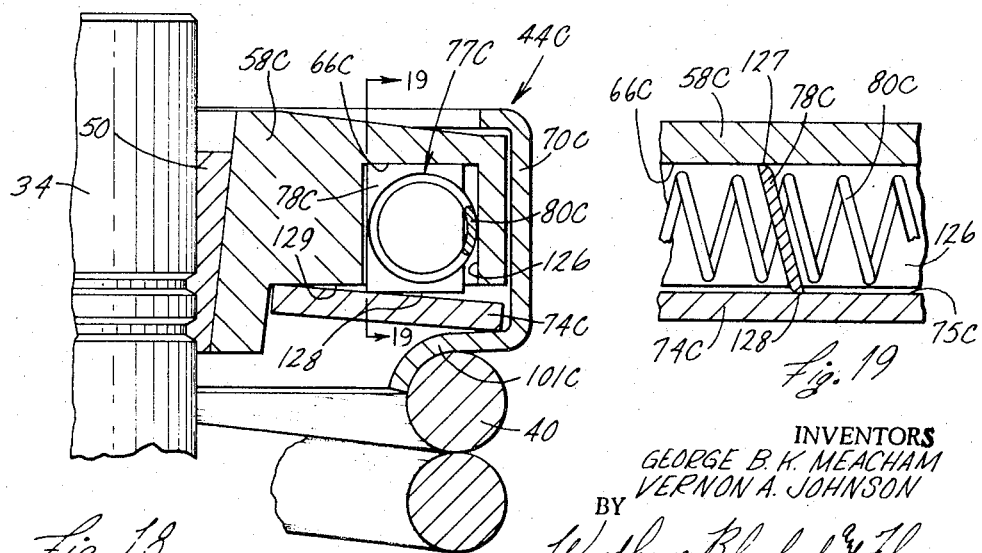

United States Patent Office 3,564,579
Patented Feb. 16, 1971

3,564,579
VALVE ROTATING DEVICE
George B. K. Meacham, Birmingham, and Vernon A. Johnson, Southfield, Mich., assignors to Eaton Yale & Towne Inc., Cleveland, Ohio, a corporation of Ohio
Continuation-in-part of application Ser. No. 687,288, Dec. 1, 1967. This application Apr. 25, 1969, Ser. No. 824,352
Int. Cl. F01l 1/32
U.S. Cl. 123—90.3                 34 Claims

ABSTRACT OF THE DISCLOSURE

A rotating device for poppet-type valves including a spring washer and a plurality of sprags positioned between first and second parts, one of said parts being interconnected for rotation with the valve. Deflection of the spring washer on the valve open stroke causes the sprags to pivot from a first to a second position relative to the spring washer, producing rocking movement of the sprags and rotation of the valve. The sprags are mounted on a resilient device which encircles the valve stem and normally but yieldably holds the sprags in said first position.

CROSS REFERENCE TO RELATED APPLICATION

This application is a continuation-in-part of application Ser. No. 687,288, now abandoned, filed Dec. 1, 1967, and entitled "Valve Rotating Device."

FIELD OF THE INVENTION

This invention relates to a valve rotating device and, more particularly, to a self-contained valve rotating device for automatically rotating poppet valves of the type used in internal combustion engines.

BACKGROUND OF THE INVENTION

A theory of operation of poppet valves is that the valve should be rotated during engine operation so that the valve will seat at a slightly different angular relationship with respect to the cylinder head on each seating cycle. This rotation causes the valve to even out any tendency for hot spots to localize and tends to eliminate carbon deposits and wear on the valve face as a result thereof. Accordingly, by the use of valve rotating devices, poppet valves operate in a more efficient manner for a greater useful life than is otherwise possible.

While numerous types of valve rotating devices have been devised, many of these devices have been unable to successfully provide a uniform step-like rotation of the valve as same is cyclically actuated between open and closed positions. Further, most of these prior known valve rotating devices have been relatively complex and, accordingly, the manufacture of such devices has been relatively costly. Further, these prior known valve rotating devices have been difficult to maintain and repair.

One typical type of known valve rotating device has involved the use of an annular retainer member fixedly connected to the valve stem with the retainer member further having a plurality of contoured cam grooves formed therein. Each of the cam grooves contains a ball member which coacts between the cam surface formed on the bottom of the groove and an axially spaced Belleville washer, the ball being acted upon by a conventional compression spring. Rotating devices of this type are costly to manufacture due to the elaborate contoured cam grooves which must be formed or machined in the retaining member.

Accordingly, it is an object of this invention to provide an improved valve rotating device, and specifically:

(1) To provide a valve rotating device containing fewer parts and having an improved service life.

(2) To provide a valve rotating device, as aforesaid, which functions to rotate the valve when same is raised off its seat.

(3) To provide a valve rotating device, as aforesaid, which can be economically and inexpensively manufactured.

(4) To provide a valve rotating device, as aforesaid, which permits ease of maintenance and replacement.

(5) To provide a valve rotating device, as aforesaid, which utilizes a plurality of sprags positioned between an annular member and a spring washer, the sprags being held within an annular sprag retainer.

(6) To provide a valve rotating device, as aforesaid, wherein the sprags have offset surfaces in contact with the annular member and the spring washer when the valve is in the closed position, movement of the valve to the open position causing an increase in the load transferred through the sprags whereby the sprags rock and cause relative rotation between the spring washer and the annular member, whereupon the valve is also caused to rotate.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is an elevational view, partially in cross section, of a poppet valve gear mechanism including a valve rotating device of the present invention.

FIG. 2 is an elevational view similar to FIG. 1 and illustrating the position of the parts of the valve rotating device when the valve is open.

FIG. 3 is an enlarged axial sectional view of the valve rotating device of the present invention, including a portion of the valve stem.

FIG. 4 is a front elevational view of a sprag-type rotating element employed in the rotating device of the present invention.

FIG. 5 is an end elevational view taken along the line 5—5 of FIG. 4.

FIG. 6 is a plan view of the sprag retainer.

FIG. 7 is a side elevational view of the sprag-retainer of FIG. 6.

FIG. 8 is a schematic view illustrating the position of a sprag in the unloaded condition, that is, the valve closed position.

FIG. 9 is a view illustrating the operation of the invention with the sprag in a loaded condition, that is, the valve open position.

FIG. 10 is an enlarged axial sectional view of a modification of the valve rotating device of the present invention, same being shown in the valve closed position.

FIG. 11 is a partial enlarged axial sectional view similar to FIG. 10 but showing the valve rotating device positioned in the valve open position.

FIG. 12 is a front elevational view of a modified sprag-type rotating element employed in the rotating device of the present invention.

FIG. 13 is a plan view of a modified sprag retainer.

FIG. 14 is a side elevational view of the sprag retainer of FIG. 13.

FIG. 15 is a schematic view illustrating the sprag held within the sprag retainer.

FIG. 16 is an elevational view, partly in cross section, of a poppet valve gear mechanism including therein a further embodiment of the valve rotating device of the present invention.

FIG. 17 is an enlarged axial sectional view of the valve rotating device illustrated in FIG. 16.

FIG. 18 is an enlarged axial sectional view of still a further embodiment of a valve rotating device according to the present invention.

FIG. 19 is a side elevational view taken along the line 19—19 of FIG. 18.

Certain terminology will be used in the following description for convenience in reference only and will not be limiting. The words "upwardly," "downwardly," "rightwardly" and "leftwardly" will designate directions in the drawings to which reference is made. The words "downwardly" and "upwardly" will specifically refer to the direction of valve movement toward the open and closed positions, respectively, since the drawings all illustrate the valves as vertically oriented. However, it will be recognized that valves utilizing rotating devices according to the present invention can be oriented at any desired angular position. The words "inwardly" and "outwardly" will refer to directions toward and away, respectively, the geometric center of the device and designated parts thereof. Said terminology will include the words above specifically mentioned, derivatives thereof and words of similar import.

SUMMARY OF THE INVENTION

The objects and purposes of the present invention are met by providing a sprag-type rotating device captured between an annular member and a spring washer, one of which is nonrotatably interconnected to the valve stem. As the valve opens and closes, the valve spring pressure is effective to deflect the spring washer and apply increased pressure against the sprags, causing them to walk incrementally around the spring washer. As the sprags walk, a sort of planetary action is provided wherein the walking of the sprags in turn causes a relative rotation between the spring washer and the annular member. Since the valve is nonrotatably connected to either the spring washer or the annular member, the valve is also caused to rotate. A ratchet-type or incremental rotating action of the valve is produced when the valve is cyclically lifted off its seat, the valve being returned to its seat in a substantially linear manner.

DETAILED DESCRIPTION

In FIGS. 1 and 2, the reference numeral 20 represents a cylinder head of an internal combustion engine, typified by an automobile engine, and the numeral 22 represents the upper portion of the combustion chamber. The numeral 24 designates an exhaust port which has a bevelled face 26. A valve 28 has a seat 30 which closes against the bevelled face 26 of the exhaust port 24. The valve 28 is of the poppet type and includes a head 32 which carries the mating seat 30 to operate against the bevelled face 26 of the exhaust port 24. The valve 28 also includes a stem 34 attached to and extending coaxially of the valve head 32. The valve stem 34 is slideably mounted in a tubular guide 36 carried by the engine cylinder head 20 and extends axially through a valve spring recess 38 formed in the head. The surface 46 formed on the upper end 49 of the valve stem 34 is adapted to be contacted by a conventional rocker arm (not shown).

A coil-type valve spring 40 has one end bottomed on the bottom wall 42 of the recess 38. The opposite end of the valve spring 40 bears against the bottom side of the valve rotator 44 of the present invention. The manner in which the rotator 44 is operatively connected to the valve stem 34 in order to rotate the valve will be discussed hereinafter. FIG. 2 shows the valve 28 in an open position with the valve spring 40 compressed, thus rendering the rotating device 44 operable.

As illustrated in FIG. 3, the top end of the valve stem 34 is provided with one or more retaining grooves 48. Two mirror-image retainer keys 50 of semi-circular transverse section and having a frusto-conical outer profile 52 and a cylindrical bore 54 are placed around the end 49 of the valve stem 34. Within the cylindrical bore 54 are semi-annular ridges 56 that rest in the retaining grooves 48 on the valve stem 34.

An annular valve retainer 58 having an internal frusto-conical profile 60 surrounds the retainer keys 50 to retain same in engagement with the grooves 48. The frusto-conical outer profile 52 is a mate to the internal profile 60 of the retainer 58.

In a production assembly operation, assembly of the retainer 58 and keys 50 to the valve stem end 49 is effected by compressing the valve spring 40, with the retainer 58 in place, then dropping in the keys 50, and afterwards relieving the spring pressure and letting the assembly snap home by the ridges 56 dropping into the grooves 48 as a result of the converging pressure produced by the internal profile 60 of the retainer 58 pressing the leaves 50 inwardly into embracing relationship with the valve stem 34. The residual spring pressure of the valve spring 40 is effective to lock the valve stem end 49 and the leaves 50 and retainer 58 together sufficiently that if the retainer is rotated by some means, the valve stem 34 and thus the valve 28 will also be rotated.

Considering now the valve rotating device 44 of the present invention, same includes an assembly of parts that operatively engage the exterior of the valve retainer 58. The exterior profile of the valve retainer 58 comprises a generally frusto-conical lower portion 59 with an annular rim or flange 64 protruding radially at the top end thereof. The bottomside of the rim 64 is formed as an annular, diametrically extending flat surface 66. Midway of the retainer 58 there is also provided a diametrically extending annular flat abutment surface 68.

The valve rotating device 44 also includes a shroud 70, suitably formed of shaped metal, which is generally of frusto-conical shape. The upper end of the shroud overlies the annular rim 64 of the retainer 58 and is effective to hold the parts in assembled relation for handling during assembly.

At the bottom of the rotating device 44 there is an annular spring seat washer 72. For assembly purposes, the washer 72 is retained in place by having its outer edge fitted within the groove 73 formed in the shroud 70. In an operational configuration, the shroud 70 serves no holding function for the parts since the load of the valve spring 40 against the spring seat washer 72 provides this holding function. However, the shroud 70 will retain the parts against being scattered throughout the engine and thus will prevent damage in the event of some unforeseen failure in the rotating device 44.

Above the spring seat washer 72 there is provided a conical Belleville spring washer 74 which surrounds the conical portion 59 of the valve retainer 58. The inner edge of the spring washer 74 preferably engages the abutment surface 68. Between the spring washer 74 and the annular surface 66 there exists an annular space 76 within which is positioned a sprag device 77 for causing valve rotation.

The sprag device 77 includes a plurality of sprags 78, here three, positioned within a sprag retainer 80. As illustrated in FIGS. 4 and 5, the sprags 78 comprise flat plate-like members having upper and lower edges 82 which are profiled (FIG. 4) to provide a rocking motion when the sprags are loaded on the upper and lower edges between the annular surface 66 of the valve retainer 58 and the upper surface 75 of the spring washer 74. Specifically, the top and bottom edges 82 are identical, but oriented to complement one another by being relatively reversed.

The edges 82 include parallel first flat surfaces 84 which blend with parallel second flat surfaces 86 through radii 88. In the embodiment shown in FIG. 4, the second flat surfaces 86 are canted from the first flat surfaces 84 at an angle of approximately eight degrees (8°). The centers of the radii 88 on opposite edges 82 are slightly offset from one another by a distance E (FIG. 8) in a circumferential direction relative to the valve to provide a rocking action to be described hereinafter. The eight degree cant will provide about one degree of valve rotation per valve open-close cycle. However, the degree of cant between the flat surfaces 84 and 86 can be modified to meet the rotational requirements of engines of different characteristics.

Referring to FIG. 3, it will be noted that the height of the sprags 78 is slightly greater than the distance between the surfaces 66 and 68 so as to compensate for the divergence between the surfaces 66 and 75 caused by the conical configuration of the spring washer 74. Thus, with the valve in the closed position (as illustrated), the upper and lower edges 82 of the sprags 78 will be maintained in contact with the surfaces 66 and 75, respectively, due to the urging of the valve spring 40. Further, the valve spring 40 causes a substantially large contact pressure to exist between the inner edge of the spring washer 74 and the annular abutment surface 68.

As shown in RIGS. 4 and 5, the end configuration of each sprag 78 includes a notch 90. The notches 90 on the opposite ends of the sprags 78 are offset above and below the center of the sprag for a purpose to be explained hereinafter. The sprags 78 are positioned within the sprag retainer 80 which, as shown in FIGS. 6 and 7, comprises an annular spring stamping with spaced radial recesses 92 on the inner periphery. The recesses 92 have a width to floatingly receive a sprag due to the sides 94 and 95 of the recesses 92 extending into the notches 90 as illustrated in FIGS. 8 and 9. At one side of each recess 92 there can be provided an ear 96 which may be cocked slightly out of the plane of the retainer 80 so as to hold the sprag 78 at the bottom of the recess 92.

OPERATION

The operation of the device embodying the invention will be described in detail hereinbelow for a better understanding of the invention.

When pressure is applied against the end surface 46 of the valve stem 34, as by means of a rocker arm, the valve 28 and the rotating device 44 are moved downwardly from the valve closed position of FIG. 1 to the valve open position of FIG. 2. This opens the valve 28 by moving the head 32 and the seat 30 away from the bevelled face 26 of the cylinder head 20. This downward movement also compresses the valve spring 40. As valve spring 40 is compressed, the spring load imposed upon the seat washer 72 is increased, and similarly the spring load imposed upon the outer edge of the spring washer 74 is likewise increased. The increased load imposed on the outer edge of the spring washer 74 tends to move or deflect same slightly upwardly in FIG. 3, whereby the spring tends to move toward a flattened condition, or alternatively, the spring tends to bow across its radial width due to the sprag 78 contacting same between the inner and outer edges thereof.

The tendency of the outer edge of the spring washer 74 to move upwardly, due to the increased load imposed thereon by the compressed valve spring 40, causes the contact pressure between the lower edge 82 of the sprags 78 and the surface 75 to be substantially increased. Simultaneously with the increase in the load transferred to the sprags 78, the contact pressure between the inner edge of spring 74 and the abutment surface 68 is substantially reduced since the sprags 78 have a height which is greater than the distance between the surfaces 66 and 68. While it is preferable to maintain the inner edge of the spring washer 74 in engagement with the abutment surface 68 at all times, it is possible that the inner edge of the spring washer 74 may move away from and leave contact with the surface 68 when the valve moves to the open position. Whether the inner edge of the spring washer 74 remains in contact with the surface 68 when the valve is moved to the open position depends upon numerous characteristics of the valve rotating device, such as the spring rate of the valve spring 40, the spring rate of the conical spring washer 74, the valve spring force imposed on the spring washer when in the valve closed position, and the change in the valve spring force imposed on the spring washer as the valve is moved to the open position. However, the operation of the valve rotating device of the present invention is the same whether the inner edge of the spring washer 74 maintains contact with the surface 68 under a diminished pressure or moves away therefrom during the valve opening operation.

Considering now the specific operation of the sprag device 77, FIGS. 8 and 9 illustrate the rocking motion imparted to a sprag 78 as a result of the applied spring load. The spring washer 74 in the loaded condition of the sprag 78 positively contacts the lower surface of the sprag. Thus, the sprag 78 is loaded upwardly against the surface 66 of the valve retainer 68. Due to the offset between the opposed parallel surfaces 84, the forces imposed on the sprags 78 creates a moment which causes the sprag to rotate or rock (clockwise in FIG. 8) about the radii 88, whereby the sprag surfaces 84 pivot away from the surfaces 66 and 75 while the sprag surfaces 86 pivot toward the surfaces 66 and 75 (as illustrated in FIG. 9). This rocking of the sprag thus causes a rotation of valve retainer 58, which in turn is fixed to and causes rotation of the valve 28 during the valve open portion of the valve open-close cycle. During the above-described rocking movement, the edge portions 94 and 95 of the resilient sprag retainer 80 are resiliently deformed. These deformed resilient edge portions 94 and 95 impose on the sprag 78 a restoring moment (counterclockwise in FIG. 9) which tends to urge the sprags back to the initial position illustrated in FIG. 8.

As the valve 28 closes, the frictional engagement between the upper edge 82 of a sprag 78 and the annular surface 66 of the valve retainer 58 is of a substantially reduced order of magnitude, thereby permitting the sprag to slip relative to the valve retainer 58 on the valve closing stroke. The same reduction in magnitude of frictional contact takes place between the bottom edge of the sprag and the spring washer 74, thereby permitting the sprag to slip relative to the surface 75. Thus, the degree of rotation previously imposed on the valve is retained.

The actual rotational mechanics of the rotating device 44 is in the nature of a planetary gear movement. The sprags 78 tend to walk along the top surface 75 of the spring washer 74 at a first rotational rate and, due to surface 66 engaging the upper surface of the sprags, cause the valve retainer 58 to rotate at a second slightly greater rate of rotation. This has a definite advantage in distributing sprag contact along a path extending completely around the annular surface 75 of the spring washer 74 and completely around the annular surface 66 of the valve retainer 58. This sprag movement evens out wear and substantially prolongs the life of the spring washer and the other elements of the valve gear mechanism.

In the embodiment shown, valve rotation was provided at about 2 r.p.m.'s at 2,000 r.p.m. engine speed. This extrapolates to 1 r.p.m. per 400 valve open-close cycles or about 1 degree of valve rotation per open-close valve cycle.

MODIFICATIONS

FIGS. 10 and 11 illustrate a modified valve rotating device 44A which is positioned adjacent the upper end of the valve stem 34 in a manner similar to FIG. 1. The valve rotating device 44A includes a valve retainer 58A connected to the upper end of valve stem 34 by conventional retainer keys 50. The retainer 58A has a substantially flat annular surface 66A formed thereon and spaced from a similar flat annular surface 75A formed on the upper side of a flat spring washer 74A. A sprag device 77A is positioned between the surfaces 66A and 75A and includes a plurality, here three, of sprags 78A in contact with the surfaces 66A and 75A and held therebetween by a sprag retainer 80A.

The sprag device 77A is surrounded by a shroud 70A which has thereon a flange portion 101 which extends inwardly underneath the outer portion of the flat spring washer 74A. The flange portion 101 effectively functions as an annular seat against which bears the upper end of the valve spring 40.

The inner end of the flat spring washer 74A is in contact with the lower surface 103 of a spacer 102, which spacer is fixedly secured to the conical portion 59A of the retainer 58A, being secured thereto by means of an interference fit between the conical portion 59A and the spacer 102. The distance between the surfaces 66A and 103 is preferably slightly less than the height of the sprags 78A. The surface 66A formed on the retainer 58A extends upwardly at a small angle, approximately 2½ degrees, relative to the outwardly extending radial direction of the valve stem 34. It should also be noted that the spring washer 74A is substantially flat when in the valve closed position such that the surface 66A and 75A thus substantially diverge in an outward radial direction.

The operation of the valve rotating device 44A disclosed in FIG. 10 is substantially similar to the valve rotating device 44 disclosed in FIG. 3. Specifically, when the valve is moved from the closed to the open position, spring 40 is compressed so that a greater load is imposed through flange 101 onto the outer edge of the flat spring washer 74A. This increased load causes an upward deflection of at least the outer portion of the spring washer 74A so that same assumes a position substantially parallel to the annular surface 66A as illustrated in FIG. 11. This upward deflection of the outer portion of the spring washer 74A causes a substantial increase in the load imposed on the sprags 78A, and likewise causes a substantial decrease in the contact pressure between the inner edge of the spring washer 74A and the surface 103. This increase in force on the sprags 78A causes rotation of the retainer 58A relative to the spring washer 74A in substantially the same manner as described above.

The sprag device 77A utilized in the valve rotating device of FIG. 10 is, as illustrated in FIGS. 12-15, slightly different from the sprag device illustrated in FIGS. 4-9 described above. Specifically, the sprag 78A comprises a substantially plate-like member which includes on the upper and lower edges 82A thereof parallel first flat surfaces 84A which blend with parallel second flat surfaces 86A, same being interconnected by small radii 88A. The second flat surfaces 86A are provided with recesses 85 therein and are canted from the first flat surfaces 84A at an angle of approximately 8 degrees. The centers of the radii 88A on the opposite edges 82A are slightly offset from one another in a circumferential direction by a small distance F (FIG. 15) to provide a rocking action substantially similar to that as described relative to the embodiment disclosed in FIGS. 8 and 9. The centers of the radii 88A are also substantially offset from one another by a distance G in an axial direction. This axial offset is desirable since it causes the rocking moment on the sprag to progressively increase as the rocking action progresses, thereby compensating for the increased resistance caused by deflection of the resilient retainer ring 80A.

As illustrated in FIG. 12, one end of the sprag 78A is provided with a notch 90A therein, which notch has at least one side 91 thereof which extends outwardly at an angle so as to cause the notch to diverge as it extends outwardly. The other end of the sprag 78A is also provided with a recess 93 therein which is formed by causing removal of a corner portion of the sprag, thereby resulting in the formation of a ledge 97. The lower portion of the sprag 78A is thus of reduced width relative to the upper portion of the sprag.

The sprags 78A are adapted to be positioned within recesses or openings 92A which are formed within the sprag retainer 80A, which sprag retainer comprises an annular spring stamping having the openings 92A formed therein as illustrated in FIG. 13. The openings 92A are completely bounded on all sides such that the sprags 78A are thus prevented from moving radially relative to the retainer 80A.

To permit a sprag 78A to be positioned within the openings 92A formed in the retainer 80A, the sprag 78A is first angularly tilted within a plane substantially transverse to the plane of the opening 92A. In this tilted position, the edge portion 94A of the retainer 80A is inserted into the notch 90A, same being made possible due to the inclined surface 91. The sprag 78 is then rotated downwardly such that the opposite edge portion 95A extends into the recess 93 and contacts the ledge 97 as illustrated in FIG. 15. The cut-away corner or recess 93 thus permits the sprag to be inserted into the opening 92A which is completely bounded on all sides, whereupon the sprag is positively held within the sprag retainer.

FIGS. 16 and 17 illustrate a further modification of a valve rotating device 44B according to the present invention. This modified valve rotating device, instead of being positioned above the valve spring 40 as in the FIG. 1 embodiment, is positioned below the valve spring 40 in bearing engagement with the bottom surface 42 of the recess 38 formed in the cylinder head 20. The underspring valve rotating device 44B (FIG. 17) includes a conical spring washer 74B which conically opens in an upward direction and has an annular surface 106 formed on the underside thereof adapted to be contacted by the sprags 78A, which sprags are held within the sprag retainer 80A. The lower edges of the sprags 78A bear against the upper surface of a hardened washer 108. The hardened washer 108 in turn bears and rests upon the base portion 111 of a shroud 109, which shroud further has an integral annular hub portion 112 in surrounding relationship to the valve guide 36 and an annular flange portion 113 extending upwardly from the outer edge of the base portion. An annular spacer 116 surrounds the hub portion 112 and has its lower surface 115 in bearing engagement with the upper surface of the hardened washer 108 adjacent the radially inner edge thereof. If desired the lower end of the hub portion 112 could be fixedly connected to the washer 108. The upper surface 117 of the annular spacer 116 bears against the inner edge of the spring washer 74B. The outer edge of the spring washer 74B is preferably provided with an annular downwardly extending stiffening flange 107 integrally formed thereon, which flange is positioned in surrounding relationship to the upwardly extending flange 113. A centering member 121 is positioned on the upper surface of the spring washer 74B and is provided with an upwardly extending annular rib or projection 122 which is adapted to extend into the coils of the valve spring 40 for maintaining same properly centered on the spring washer 74B. The hub 112 of the shroud 109 is further provided with a flared flange 123 on the upper end thereof, which flared flange overlies the inner edge of the centering member 121 for maintaining the complete rotating device in an assembled relationship.

The embodiment illustrated in FIG. 17 is advantageous since use of the stiffening flange 107 on the spring washer 74B enables the valve spring 40 to bear directly against the spring washer 74B, thereby eliminating the need to provide an intermediate washer, such as the washer 72 disclosed in FIG. 3. Further, use of the hardened washer 108 provides a durable and wear resistant race on which the sprags 78A may operate, while at the same time the hardened washer 108 can be inexpensively manufactured, thereby reducing the overall cost of the valve rotating device. Further, by utilizing a separate hardened washer 108, the shroud 109 can be formed inexpensively from sheet-like material. However, the hardened washer 108 and the shroud 109 can be a single integral member if desired.

The operation of the valve rotating device 44B illustrated in FIG. 17 is substantially similar to the operation described above. Namely, when the valve is moved to the open position, spring 40 is further compressed so as to impose an increased load on the outer edges of the spring washer 74B (downwardly in FIG. 17), whereupon the lower surface 106 tends to assume a position substantially parallel with the upper surface of the hardened washer 108. This downward loading of the outer edge of the spring washer 74B causes a substantial increase in the load imposed on the sprags 78A, while simultaneously causing a substantial decrease in the contact pressure between the inner edge of the spring washer 74B and the surface 117. The increased load imposed on the sprags 78A causes the sprags to rock, which causes the spring washer 74B to rotate relative to the stationary hardened washer 108. Rotation of spring washer 74B also causes the valve spring 40 and the retainer 58B to rotate, which in turn causes rotation of the valve.

FIGS. 18 and 19 illustrate still a further modification of a valve rotating device 44C. The valve rotating device 44C is positioned adjacent the upper end of the valve stem 34 above the valve spring 40. Thus, same is commonly referred to as an overspring valve rotating device, thus being similar to the valve rotating devices disclosed in FIGS. 3 and 10.

The valve rotating device 44C, as illustrated in FIG. 18, again comprises an annular retainer member 58C connected to the upper end of the valve stem 34 by means of conventional keys 50. The retainer 58C is provided with a downwardly opening annular recess 126 formed therein, which recess is of a substantially rectangular cross-sectional configuration having an upper surface designated as 66C. The recess 126 accommodates therein the sprag device 77C, which sprag device includes a plurality of plate-like sprags 78C which are positioned within the recess 126 and are retained therein by means of a sprag retainer 80C, which sprag retainer comprises a coil-type garter spring which is positioned within and extends continuously around the annular recess 126. The sprags 78C extend into and between adjacent coils of the retainer spring 80C so as to be held in position thereby. The inclination of the adjacent coils will automatically cause the sprags to assume an inclined position (FIG. 19) such that the upper edge 127 thereof will contact the surface 66C at a position circumferentially spaced from the point at which the lower edge 128 of the sprag contacts the upper surface of the spring washer 74C.

As illustrated in FIG. 18, the valve rotating device 44C includes a shroud 70C which surrounds the valve retainer 58C and has an inwardly directed flange portion 101C which extends underneath the outer edge portion of the spring washer 74C and further acts as an annular seat for the upper end of the valve spring 40. The valve rotating device 44C operates in substantially the same manner as described above since movement of the valve to the open position causes an increase in the load imposed on the outer edge of the conical spring washer 74C, which in turn causes an increase in the load imposed on the sprags 78C and a simultaneous decrease in the contact pressure between the inner edge of the spring washer 74C and the lower surface 129 of the retainer 58C. Due to the angular inclination of the sprags 78C (FIG. 19), the increased load imposed upon the sprags due to the deflection of the spring washer 74C will cause the sprags to substantially pivot (counterclockwise in FIG. 19) about the lower edge 128 thereof (where same contacts the upper surface of the spring washer 74C), which pivoting movement will cause the upper edge 127 of the sprag to move laterally (circumferentially of the valve) relative to the lower edge 128, carrying with it the valve retainer 58C whereby the valve retainer 58C and the valve is rotated. When the valve is again moved to the closed position the valve spring force imposed on the sprag will be relieved and the spring retainer 80C will cause the sprag to slip back to its original position as illustrated in FIG. 19. The valve and valve retainer will thus be maintained in their rotatably advanced position.

The embodiments of the invention in which we claim an exclusive property or privilege are defined as follows:

1. A valve rotating device, comprising:
   a first radially extending part;
   a second radially extending part rotatable relative to said first part, said second part comprising an annular spring washer;
   spacer means coacting with said first and second parts for maintaining a minimum distance therebetween;
   means for causing relative rotation between said first and second parts when said spring washer is deflected, said means including at least one rockable element having opposed surfaces with one of the surfaces engaging said first part and the other of the surfaces engaging the second part; and
   means including a resilient annular retainer member positioned between said first and second parts for maintaining said rockable element in an attitude such that the opposed surfaces engage said first and second parts;
   whereby rocking movement of said rockable element relative to one of said first and second parts causes relative rotation between said first and second parts.

2. A valve rotating device according to claim 1, in which the annular retainer member comprises an annular spring member having receiving means therein for cooperably receiving the rockable element.

3. A valve rotating device according to claim 1, in which the annular retainer member has receiving means therein for cooperably receiving the rockable element, and the rockable element having notch means formed therein for coacting with said retainer member.

4. A valve rotating device according to claim 1, particularly for use with a valve gear train having a coil spring, in which the spacer means is disposed adjacent and has a portion thereof in contact with one side of said annular spring washer, the coil spring being adapted to be disposed adjacent the opposite side of said annular spring washer for applying a force to said annular spring washer at a selected radial position, and said rockable element engaging said annular spring washer at a location radially intermediate said portion of said spacer means and said selected radial location.

5. A valve rotating device according to claim 4, wherein the spacer means contacts said annular spring washer adjacent the inner radial edge thereof and said selected radial location is adjacent the outer radial edge thereof.

6. A valve rotating device according to claim 1, in which said first part comprises an annular plate-like member, said spacer means including a spacer member coacting between said first part and said annular spring washer with said spacer member being positioned adjacent the inner radial edge of said spring washer, said spacer member and said rockable element being disposed adjacent one side of said spring washer with said rockable element being spaced radially outwardly from said spacer member, and spring means including a coil spring disposed adjacent the other side of said annular spring washer for applying a force to said annular spring washer at a location disposed radially outwardly from said rockable element.

7. A valve rotating device according to claim 6, particularly for use with a valve member having an elongated stem with said rotating device substantially encircling said stem, in which said first part is nonrotatably interconnected to said valve stem whereby rocking movement of said rockable element causes said first part and said valve member to rotate.

8. A valve rotating device according to claim 6, particularly for use with a valve member having an elongated valve stem with said valve rotating device substantially encircling said valve stem in which said first part is stationarily mounted and said annular spring washer and said coil spring rotate with said valve member.

9. A valve rotating device, comprising:
first and second relatively rotatable parts together having portions defining an annular zone;
an annular spring washer in said annular zone having inner and outer edges engageable with the first and second parts, respectively;
means for causing relative rotation between said first and second parts when said spring washer is deflected, said means including at least one rockable element having opposed surfaces with one of the surfaces engaging one of the first and second parts and the other of the surfaces engaging the spring washer for causing relative rotation therebetween; and
means including a resilient annular retainer member positioned in said annular space for maintaining said rockable element in an attitude such that the opposed surfaces thereof engage said one of said first and second parts and said annular spring washer.

10. A valve rotating device according to claim 9, in which said retainer member comprises a ring-like annular spring member.

11. A valve rotating device according to claim 9, in which said retainer member comprises an annular resilient washer having recess means cooperably receiving said rockable element therein.

12. A valve rotating device according to claim 11, in which the rockable element includes recesses cooperable with the recess means of said annular resilient washer.

13. A valve rotating device according to claim 9, in which said rockable element is angularly movable within a plane which is substantially transverse to the radial direction of said annular zone, and said rockable element has within said transverse plane a noncircular cross section.

14. A valve rotating device according to claim 13, in which said retainer member comprises a ring-like annular spring member.

15. A valve rotating device according to claim 13, in which said retainer member comprises an annular ring-like resilient element having a pluralty of radial slots formed therein, and in which there is provided a plurality of rockable elements each having notches formed in the opposite end edges thereof, said rockable elements being positioned within said radial slots and said retainer member having portions adjacent the edges of said slots positioned within said notches for retaining and carrying said rockable elements on said retainer member.

16. A valve rotating device according to claim 13, in which said retainer member comprises an annular ring-like resilient element having a plurality of circumferentially spaced, axially oriented openings extending therethrough, and in which there is provided a plurality of rockable elements positioned within said respective openings, each of said rockable elements having a notch formed in one edge thereof and having a ledge formed on the opposite edge, said retainer member having a first portion adjacent one side of said opening positioned within said notch and having a second portion adjacent the other side of said opening positioned directly adjacent said ledge for retaining and carrying said rockable elements on said retainer member.

17. A valve rotating device according to claim 13, in which said one of said first and second parts and said spring washer have first and second bearing surfaces thereon, respectively, said first and second bearing surfaces being relatively movable toward one another from a first position to a second position due to deflection of said spring washer in response to imposition of an increased load thereon, said deflection of said spring washer causing imposition of a moment on said rockable element whereby said rockable element is angularly displaced from a first rotational position to a second rotational position, said rockable element having an external configuration for causing said moment to progressively increase as said rockable element angularly moves from said first rotational position to said second rotational position.

18. A valve rotating device according to claim 13, in which said one part includes a hardened annular bearing washer spaced from said spring washer and an annular spacer member extending between said spring washer and said bearing washer, said spacer member having an abutment surface thereon in engagement with one of the edges of the spring washer, and in which said second part comprises a coil spring having one end thereof in bearing engagement with the other edge of said spring washer.

19. A valve rotating device according to claim 13, in which said first part includes valve retainer means nonrotatably secured to a valve and including abutment means having an abutment surface in engagement with one edge of said spring washer, said second part comprising a housing means at least partially surrounding said valve retainer means and having a portion thereof spaced from said valve retainer means to define said annular space, said portion of said housing means being in engagement with the other edge of said spring washer, and a coil spring having one end thereof bearing against said portion of said housing means for urging same against said other edge of said spring washer.

20. A valve rotating device according to claim 13, in which said first part includes valve retainer means nonrotatably secured to a valve and including abutment means having an abutment surface in engagement with one edge of said spring washer, said second part comprising an annular bearing washer positioned adjacent said spring washer and in engagement with the other edge thereof, a coil spring having one end thereof in engagement with said annular bearing washer for urging same against said other edge of said spring washer, and an annular housing member surrounding said valve retainer means, spring washer and bearing washer.

21. A valve rotating device for a valve gear mechanism including a poppet valve having a stem thereon with said valve being movable within a housing, said device comprising:
valve retainer means nonrotatably secured to said valve stem;
spring means coacting between said valve retainer means and said housing for urging said valve to a closed position;
rotating means disposed between said spring means and said valve retainer means for causing rotation of said valve when same is displaced from said closed position;
said rotating means including an annular bearing member and an annular spring washer each having a bearing surface thereon, one of said annular bearing member and annular spring washer being interconnected with said valve for rotation therewith, the other of said bearing member and spring washer being stationarily positioned relative to said housing;
said rotation means further including a plurality of rockable sprag elements positioned between and in engagement with the bearing surfaces of said annular bearing member and said annular spring washer, said sprag elements being angularly rockable from a first to a second rotational position in response to movement of said bearing surfaces toward one another, angular movement of said sprag elements from said to first to said second position causing relative rotation between said annular bearing member and said annular spring washer, and
an annular ring-like resilient retainer element positioned between the bearing surfaces formed on said annular spring washer and said annular bearing member, said annular retainer element having a plurality of receiving means with said plurality of sprag elements being positioned within said receiving means, said retainer element and said sprag elements having cooperating means for retaining the sprag elements in an attitude such that opposite surfaces of the sprag elements are maintained in engagement with said bearing surfaces.

22. A valve rotating device according to claim 21, further including abutment means interconnected to said valve retainer means, said abutment means having an abutment surface in engagement with the inner edge of said spring washer, and an intermediate annular member disposed between said spring means and the outer edge of said annular spring washer whereby said spring means urges said intermediate annular member into engagement with the outer edge of said spring washer.

23. A valve rotating device according to claim 21, wherein said annular spring washer is initially conical with same being deflected toward a flattened configuration upon movement of said valve from the closed to an open position, deflection of said annular spring washer toward said flattened condition causing the bearing surfaces on said spring washer and said annular bearing member to move toward one another for causing rotation of said valve retainer means and said valve.

24. A valve rotating device according to claim 21, in which said spring washer is initially flat, movement of said valve from the closed to an open position causing said spring washer to be deflected toward a conical configuration whereby the bearing surfaces on said annular spring washer and said annular bearing member are moved toward one another for causing rotation of said valve retainer means and said valve.

25. A valve rotating device according to claim 1, in which the rockable element comprises a platelike member having its opopsite edges exposed for engagement with said first and second parts, said rockable element having a noncircular cross section within the plane of rocking movement.

26. A valve rotating device, comprising:
a first radially extending part;
a second radially extending part rotatable relative to said first part;
means for causing relative rotation between said first and second parts when said first and second parts are relatively moved toward one another, said means including at least one rockable element having opposed surfaces with one of the surfaces engaging said first part and the other of the surfaces engaging the second part, one of said first and second parts comprising an annular spring washer, relative movement of said first and second parts toward one another and deflection of said washer causing imposition of a moment on said rockable element whereby said rockable element is angularly displaced from a first rotational position to a second rotational position for causing relative rotation between said first and second parts, said rockable element having an external configuration for causing said moment to progressively increase as said rockable element angularly moves from said first rotational position to said second rotational position; and
resilient means coacting with said rockable element for maintaining same in an attitude such that the opposed surfaces engage said first and second parts.

27. A valve rotating device, comprising:
first and second means each having radially extending portions mounted for relative rotation therebetween, said second means including an annular spring means;
means for causing relative rotation between the radial portions of said first and second means when said spring means is deflected, said rotation means including at least one rockable element having opposed surfaces with one of the surfaces engaging the radial portion of said first means and the other of the surfaces engaging the radial portion of said second means; and
means including a resilient annular retainer member positioned between the radial portions of said first and second means for maintaining said rockable element in an attitude such that the opposed surfaces engage said first and second means;
whereby rocking movement of said rockable element relative to one of said first and second means causes relative rotation between the radial portions of said first and second means.

28. A valve rotating device according to claim 27, in which the rockable element has a noncircular cross section within the plane of rocking movement.

29. A valve rotating device according to claim 28, in which the retainer member comprises an annular, ringlike spring member defining receiving means for cooperably receiving the rockable element.

30. A valve rotator according to claim 29, in which the rockable element and the retainer member are independent and separable elements, and said retainer member has an axially oriented recess in which said rockable element is positioned.

31. A valve rotator according to claim 27, in which the radial portions of the first and second means each have substantially flat annular surfaces formed thereon with said surfaces being free of grooves or recesses, and the opposed surfaces of said rockable element being maintained in engagement with the flat surfaces of said first and second means.

32. A valve rotator according to claim 27, in which the spring means comprises an annular spring washer having an annular, axially extending stiffening flange integrally connected to the outer edge thereof.

33. A valve rotating device according to claim 27, in which the rockable element and its retainer member are independent and separable.

34. A valve rotator according to claim 33, particularly for use with a valve member having an elongated stem with said rotating device substantially encircling said stem, said resilient annular retainer member also encircling said stem and having means cooperating with a plurality with said rockable elements for maintaining said rockable elements in an attitude such that the opposed surfaces thereof engage said first and second means.

References Cited
UNITED STATES PATENTS

| | | | |
|---|---|---|---|
| 2,397,502 | 4/1946 | Ralston | 123—188 |
| 2,516,795 | 7/1950 | Norton | 123—90 |
| 2,743,714 | 5/1956 | Hanson, Jr., et al. | 123—90 |
| 2,758,583 | 8/1956 | Norton | 123—90 |
| 2,761,434 | 9/1956 | Norton | 123—90 |
| 2,835,236 | 5/1958 | Dadd | 123—90 |

AL LAWRENCE SMITH, Primary Examiner